April 27, 1954   B. C. FLEMING-WILLIAMS ET AL   2,677,090
STEP-BY-STEP ELECTRIC MOTOR
Filed Sept. 11, 1950                                3 Sheets-Sheet 1
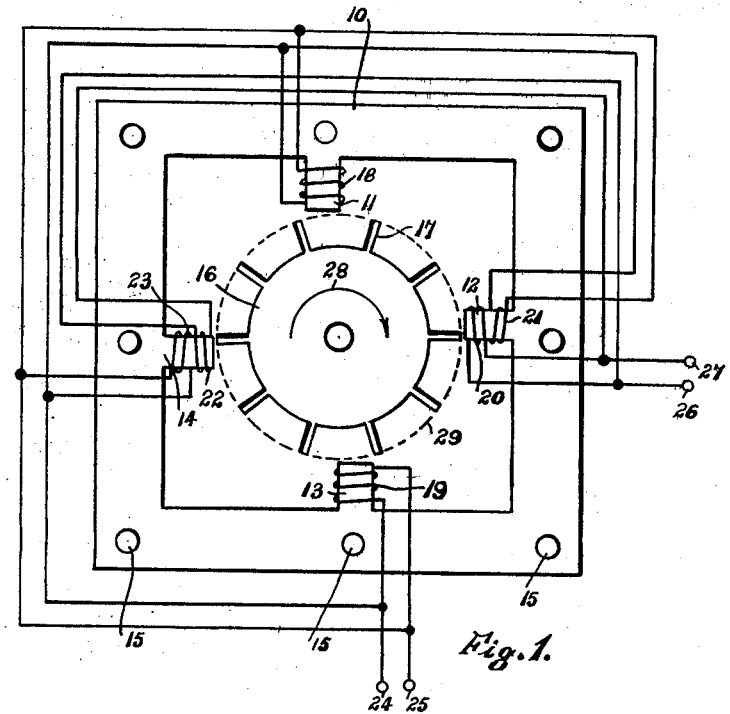
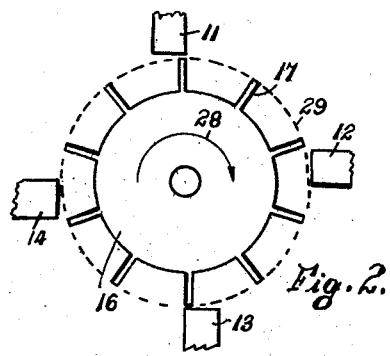
INVENTORS
Brian C. Fleming-Williams
Clement R. Woodward
By Ralph B. Stewart
Attorney INVENTOR
Brian C. Fleming-Williams
Clement R. Woodward
By Ralph B. Stewart
Attorney

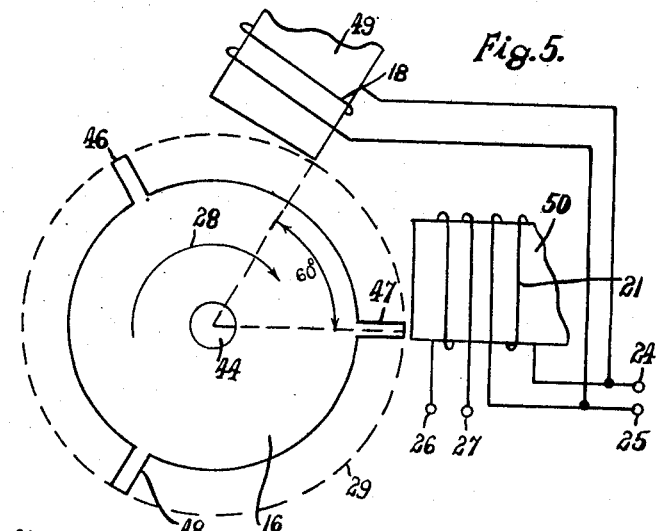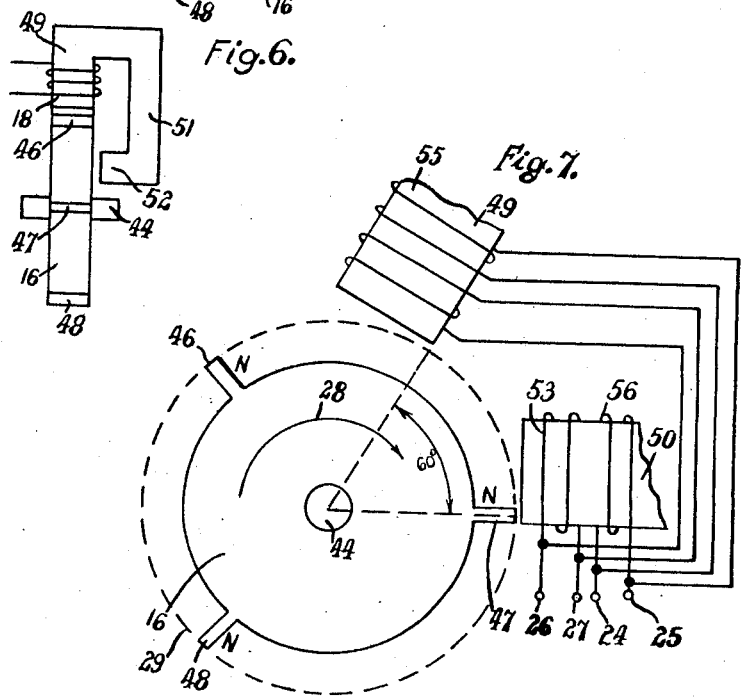

Patented Apr. 27, 1954

2,677,090

UNITED STATES PATENT OFFICE 2,677,090

STEP-BY-STEP ELECTRIC MOTOR

Brian Clifford Fleming-Williams and Clement Ralph Woodward, London, England, assignors to A. C. Cossor Limited, London, England, a company of Great Britain Application September 11, 1950, Serial No. 184,172

Claims priority, application Great Britain September 13, 1949

1 Claim. (Cl. 318—443)

The present invention relates to step-by-step electric motors, that is to say motors of the type in which the rotor is adapted to execute step-by-step rotation on the application of pulsating or alternating current to the motor.

Such motors may be employed for a variety of purposes such as, for example, for counting the number of pulses or cycles of current occurring in a circuit or for the remote operation of a switch coupled to the motor.

A known motor of this type comprises a toothed wheel whose teeth are engaged in turn by a claw which is actuated by an electro-magnet. Each pulse applied to the electro-magnet causes the claw to rotate the wheel through a predetermined angle, the claw being released at the end of the pulse to engage with a further tooth.

An object of the present invention is to provide an improved motor of the type specified in which the only moving part need be a rotor, step-by-step rotation of the rotor being produced entirely electrically.

According to the present invention, a motor of the type specified comprises two members, namely a rotor and a stator, of ferro-magnetic material, one having at least two torque-producing poles and the other having at least three torque-producing poles, the rotor member being mounted for rotation relatively to the stator member in such a manner that the faces of the torque-producing poles on the rotor member can be brought in succession before the face of each of the torque-producing poles on that stator member, the projection of the face of each torque-producing pole of one of the members on to the surface swept out by the outer extremities of the torque-producing poles on the rotor member, having a length, measured in the direction of relative movement of such pole with respect to a facing pole on the other member, which is greater than that of the projection of the face of each of the torque-producing poles of the other member on to the said surface, windings being provided whereby each of the torque-producing poles on one of the members can have its state of magnetisation varied to either of two conditions, and whereby adjacent torque-producing poles on the last-named member can have their states of magnetisation varied differentially to the two conditions, and the numbers and dispositions of the torque-producing poles on the two members, and the shapes of the pole faces of the said larger dimension being such that, in operation, when the windings are energised by pulsating or alternating current to cause the states of magnetisation of the said adjacent poles to be varied differentially, the rotor member rotates in step-by-step fashion, each step being effected by a reversal of the relative magnetic states of the said adjacent poles. The torque-producing poles on the two members are those between which, in operation, forces exist to produce rotation of the rotor member. One or more other poles may be provided for the purpose of completing the magnetic circuit from the rotor member back to the stator member or vice versa. The said face of each torque-producing pole on each member is that face through which the majority of the magnetic flux passes when facing a pole on the other member.

Further according to the invention, a motor of the type specified comprises two members, namely a rotor and a stator, of ferro-magnetic material, one having at least two torque-producing poles and the other having at least three torque-producing poles, the numbers of torque-producing poles on the two members being unequal, the rotor member being mounted for rotation relatively to the stator member in such a manner that the faces of the torque-producing poles on the rotor member can be brought in succession before the face of each of the torque-producing poles on the stator member, the projection of the face of each torque-producing pole of one of the members on to the surface swept out by the outer extremities of the torque-producing poles on the rotor member, having a length, measured in the direction of relative movement of such pole with respect to a facing pole on the other member, which is greater than that of the projection of the face of each of the torque-producing poles of the other member on to the said surface, the major part of each pole face of the said larger dimension lying in a surface whose distance from the surface swept out by the outer extremities of the torque-producing poles of the rotor member decreases, proceeding in the direction of rotation of the rotor member, when this face is of a torque-producing pole on the stator member, or proceeding in the opposite direction when this face is of a torque-producing pole on the rotor member, whereby each face of the said larger dimension has a region nearest the last-named surface, the disposition of the torque-producing poles on the two members being such that when a pole face of the smaller dimension is facing the said region on a pole face of the said larger dimension, the said region on another of the pole faces of the said larger dimension is not facing any pole face of the said smaller dimension, and that when the last-named pole face of the said larger dimension is of a torque-producing pole on the stator member the torque-producing pole nearest thereto on the rotor member lies in the opposite direction to the direction of rotation of the rotor member, or where the last-named pole face of the said larger dimension is of a torque-producing pole on the rotor member the torque-producing pole nearest thereto on the stator member lies in the direction of rotation of the rotor member, and windings being provided whereby each of the torque-producing poles on one of the members can have its state of magnetisation varied to either of two conditions and whereby adjacent torque-producing poles on the last-named member can have their states of magnetisation varied differentially.

The invention will now be described, by way of example with reference to the accompanying drawings.

Figure 1 is a schematic drawing of one embodiment of the invention showing a rotor having ten torque-producing poles and a stator having four torque-producing poles.

Figure 2 shows the rotor of Figure 1 rotated through 18°,

Figure 3:
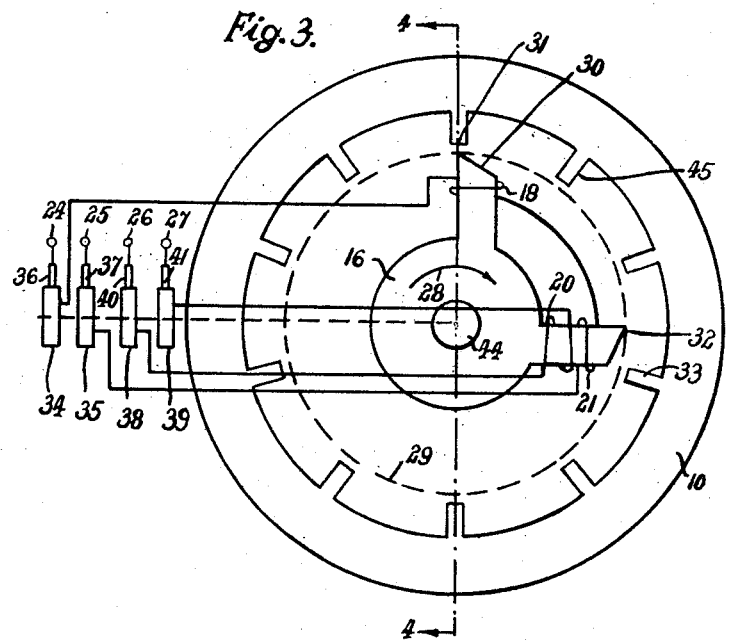
Figure 4:
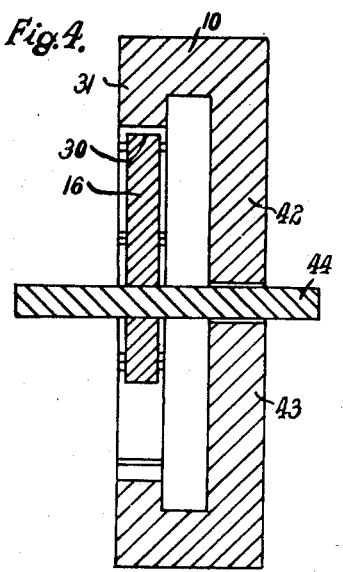

Figures 3 and 4 show a second embodiment of the invention in which the rotor has two torque-producing poles and the stator has ten torque-producing poles, Figure 5 shows a third embodiment of the invention in which the rotor has three torque-producing poles and the stator has two torque-producing poles, Figure 6 is a side view on a reduced scale showing part of the arrangement of Figure 5, and Figure 7 shows a further embodiment of the invention in which the rotor is polarised.

The step-by-step motor shown in Figures 1 and 2 comprises a stator 10 having four poles 11, 12, 13 and 14, constituted by laminations held together by bolts (not shown) passed through eight apertures 15. A laminated rotor 16 has ten equally-spaced poles 17, and is mounted for rotation in the gaps between opposite poles on the stator. The stator poles 11 and 13 carry single windings 18 and 19 respectively, and the stator poles 12 and 14 each carry two windings 20, 21 and 22, 23 respectively. The windings 18, 19, 21, 23 are connected in series or in parallel to two terminals 24, 25 and windings 20 and 22 are connected in series or in parallel to two terminals 26 and 27, the parallel connections being shown.

In operation direct current is applied to the terminals 26 and 27 and pulses are applied to the terminals 24 and 25, the pulses being generated in any suitable manner. It is arranged that the rotor rotates in the direction indicated by the arrow 28 and is shown in a position occupied when the amplitude of the applied pulses is zero, that is to say when the magnetisation produced by the windings 18, 19, 21 and 23 is zero. The windings 20 and 22 are continuously energised, however, causing magnetisation of the stator poles 12 and 14, and two diametrically opposite rotor poles are attracted to the stator poles 12 and 14 and held in this position as shown.

The face of each stator pole is arranged to lie in a plane at right angles to the stator pole axis, the axes of the stator poles 12 and 14 are arranged to be parallel to, but offset respectively above and below, the horizontal plane passing through the rotor axis, and the axes of the stator poles 11 and 13 are arranged to be parallel to, but offset to the left and right respectively of, the vertical plane passing through and parallel with the rotor axis. The surface swept out by the faces of the rotor poles is indicated by a broken line 29 and it will be seen that because of the disposition of the stator poles the faces thereof approach this surface in the direction of rotation of the rotor. The position of the rotor giving the minimum gap between the rotor poles and the stator poles 12 and 14 is, as shown, that in which the rotor poles opposite the stator poles 12 and 14 are near the lower and upper edges of these stator poles respectively. The rotor therefore takes up that position. It will be appreciated that in order to obtain this position of the rotor the dimension of the projection of the face of each rotor pole on to the surface 29, measured in the direction of a relative movement between this pole and a facing stator pole must be substantially smaller than the dimension in the said direction of the projection of each stator pole face on to the surface 29.

When a pulse is applied to the terminals 24 and 25, the stator poles 11 and 13 become magnetised and 12 and 14 become demagnetised, it being arranged that the magnetisation resulting from the application of the pulse to the windings 21 and 23 is substantially equal and opposite to that produced by the direct current flowing in the windings 20 and 22. It will be seen, therefore, that the pairs of poles 12, 14 and 11, 13 have one state of magnetisation in which they are magnetised and another state in which they are demagnetised and that the two pairs of poles have their states of magnetisation varied differentially, that is to say one pair being magnetised when the other is demagnetised and vice versa.

It will be seen from the drawing that the distance between the stator pole 11 and the rotor pole immediately to the left thereof, is smaller than the distance between this rotor pole and any other stator pole. Furthermore the distance between the stator pole 11 and the rotor pole immediately to the right thereof is larger than the distance between the stator pole 11 and the rotor pole immediately to the left of the stator pole 11. Similarly the distance between the stator pole 13 and the rotor pole immediately to the right thereof is shorter than the distance between this rotor pole and any other stator pole. The distance between the stator pole 13 and the rotor pole immediately to the left thereof is larger than the distance between the stator pole 13 and the rotor pole immediately to the right thereof. When, therefore, the pulse is applied to the terminals 24 and 25 rotation of the rotor takes place in the direction of the arrow 28 through approximately 18°, and takes up the position shown in Figure 2.

On the cessation of the pulse the stator poles 11 and 13 become demagnetised and the stator poles 12 and 14 become magnetised. The rotor then makes a further rotation of 18° in the direction of the arrow 28 to bring the rotor into a position advanced on that shown in Figure 1 by the rotor pole pitch.

For each applied pulse the rotor therefore makes two rotational steps through angles of 18° each, and hence ten pulses are necessary to produce one complete revolution of the rotor.

Alternating current may be applied to the terminals 24 and 25 instead of pulsating current.

In this case it is necessary to make the peak magnetisation of the poles 12 and 14 resulting from the alternating current substantially equal to that produced by the direct current applied to the terminals 26 and 27.

Although the embodiment described has ten rotor poles and two pairs of stator poles it will be understood that other arrangements of poles may be used. For example in the arrangement of Figure 1 it will be appreciated that two magnetic circuits are used, one including the stator poles 12 and 14 and the rotor, the other including the stator poles 11 and 12 and the rotor. It will be appreciated that, in operation, torque-producing forces exist between each rotor pole and stator pole in turn. The stator poles 13 and 14, or 11 and 12, could be dispensed with provided a suitable flux path is provided, say through the rotor spindle. On the other hand, by increasing the number of stator poles the number of magnetic circuits may be increased.

Figure 3 shows an arrangement in which the rotor 16 has two torque-producing poles and the stator 10 has ten equally-spaced torque-producing poles, and in which the operating windings are on the rotor poles. The dimension, of the projection of the face of each rotor pole on to the surface 29 measured in the direction of relative movement between this pole and a facing stator pole is made substantially larger than the dimension, in the said direction of the projection of the face of each of the stator poles on to the surface 29 as shown. The pole face of each rotor pole lies in a surface which approaches the surface 29 proceeding in the opposite direction to that of rotation of the rotor. With the rotor in the position shown in the drawing the region of the face of the pole 30, nearest the surface 29, faces the stator pole 31, and the region of the face of the other rotor pole 32 nearest the surface 29 does not face any stator pole. It will be seen from the drawing that the stator pole nearest the rotor pole 32 is the stator pole 33 which lies in the direction of rotation from the rotor pole 32. The windings 18 and 21 on the rotor poles 30 and 32 respectively are connected in series between two slip rings 34 and 35 whose brushes 36 and 37 are connected to the terminals 24 and 25 respectively. The winding 20 on the rotor pole 32 is connected between two slip rings 38 and 39 whose brushes 40 and 41 are connected to the terminals 26 and 27 respectively. Direct voltage is applied to the terminals 26 and 27 and pulsating, or alternating, voltage is applied to the terminals 24 and 25 as in the arrangement of Figure 1.

Referring now to Figure 4 this is a view in cross-section taken at 4—4 in Figure 3, and shows the return flux path between the rotor and stator of Figure 3. The stator has two further poles 42 and 43 and the rotor spindle passes between the faces of these pole pieces. It will be appreciated that the poles 42 and 43 and the spindle 44 do not have torque-producing forces between them to cause rotation of the rotor.

Referring again to Figure 3 this shows the rotor in a position when a pulse is already applied to the terminals 24 and 25 causing magnetisation of the rotor pole 30 and demagnetisation of the rotor pole 32. When the pulse is removed from the terminals 24 and 25 the rotor pole 30 becomes demagnetised and the rotor pole 32 becomes magnetised. The stator pole nearest to the rotor pole 32 is the stator pole 33 and hence the rotor rotates to a position in which the region of the face of the pope 32 nearest the surface 29 faces the stator pole 33. On the application of a further pulse to the terminals 24 and 25 the rotor rotates to a position in which the region of the face of the pole 30 nearest the surface 29 faces the stator pole 45. It will be seen, therefore, that each pulse applied to the terminals 24 and 25 cause the rotor to execute two rotational steps each of about 18° and hence ten pulses are required to make the rotor execute one complete revolution.

Figure 5 shows an embodiment of the invention in which the rotor 16 has three equally-spaced poles 46, 47 and 48 and the stator has two poles 49 and 50 spaced as shown. The projection of the face of each of the two stator poles on to the surface 29 has a dimension, in the direction of relative movement between this pole and a facing rotor pole which is substantially larger than the dimension, in the said direction of the projection of the face of each of the rotor poles on to the surface 29. The stator poles 49 and 50 are provided with windings 18 and 21 respectively which are connected in parallel to the two terminals 24 and 25.

When the rotor is in the position shown no pulse is being applied to the terminals 24 and 25. As direct voltage is applied to the terminals 26 and 27 the stator pole 50 is magnetised and the rotor pole 47 is held in the position shown. The rotor pole nearest to the stator pole 49 is the rotor pole 46. When, therefore, a pulse is applied to the terminals 24 and 25 to demagnetise the stator pole 50 and to magnetise the stator pole 49 the rotor rotates through 60° in the direction of the arrow 28 to the position in which the rotor pole 46 faces the region of the face of the pole 49 nearest the surface 29. When the pulse is removed the rotor rotates a further 60° in the direction of the arrow 28 to a position in which the rotor pole 46 occupies the position occupied by the pole 47 in the drawing. It will be seen, therefore, that it is necessary to apply three pulses to produce one complete revolution of the rotor.

In the arrangement of Figure 5 each stator pole has a separate magnetic circuit and Figure 6 shows the return path for the flux in the stator pole 49, the pole 50 being omitted. It will be seen that this path for the stator pole 49 is through an arm 51 and a pole 52 back to the rotor 16.

Figure 7 shows an arrangement in which the numbers and dispositions of the poles on the rotor and stator are the same as in Figure 5. The rotor is, however, polarised in this example in such a manner that each rotor pole is a north magnetic pole. A winding 54 on the stator pole 49 is connected in parallel with a winding 53 on the stator pole 50 to the terminals 26 and 27 to which direct voltage is applied. A winding 55 on the stator pole 49 is connected in parallel with a winding 56 on the stator pole 50 to the terminals 24 and 25 to which pulses are applied.

The windings 53 and 54 and the polarity of the direct voltage applied to the terminals 26 and 27 are made such that in the absence of a pulse at the terminals 24 and 25 the stator pole 50 is a south magnetic pole and the stator pole 49 is a north magnetic pole. The rotor then takes up a position, as shown, with one of its poles facing the region, on the stator pole 50, nearest the surface 29.

The windings 55 and 56 and the polarity and magnitude of the pulses applied to the terminals 24 and 25 are arranged to be such that each applied pulse causes the stator pole 49 to become a south magnetic pole and the stator pole 50 to become a north magnetic pole. In this way the magnetic states of the stator poles are varied differentially to two conditions. In one condition the stator poles 49 and 50 are north and south magnetic poles respectively and in the other condition the stator poles 49 and 50 are south and north magnetic poles, respectively.

When the stator poles 49 and 50 are made south and north magnetic poles respectively, on the application of a pulse to the terminals 24 and 25, the rotor pole 46 is attracted towards the stator pole 49 and the rotor pole 47 is repelled away from the stator pole 50. The rotor rotates, therefore, through 60° in the direction of the arrow 28 and takes up a position in which the rotor pole 46 faces the region on the stator pole 49 nearest the surface 29. When the pulse ceases the rotor pole 46 being nearer to the stator pole 50 than the rotor pole 47 is attracted towards the stator pole 50 and the rotor rotates through a further 60°. As in the arrangement of Figure 5, therefore, three pulses are required to produce one complete revolution of the rotor.

In the arrangements hereinbefore described the speed of operation may be made as high as, say, 1½ complete revolutions per second by suitably designing the motor, and for operation at these speeds it may be found necessary to apply a brake to the rotor shaft. The brake may be arranged to apply a constant braking force for example by means of friction. On the other hand the brake may be arranged to apply a braking force which is dependent upon the speed of rotation of the rotor, the braking force increasing with increase in speed and decreasing with decrease in speed. The brake may also be in the form of an oscillation damper such, for example, as described at page 332 in volume 21 (entitled "Electronic Instruments") of the Massachusetts Institute of Technology Radiation Laboratory Series, published by the McGraw-Hill Book Company.

We claim:

A step-by-step electric motor comprising a stator having a plurality of torque-producing poles, a rotor having a plurality of torque-producing poles that are constantly polarized with like polarity, first and second windings on one of said stator poles, first and second windings on another of said stator poles, said two first windings being oppositely poled, and said two second windings being oppositely poled, means connecting said two first windings to a source of direct current to provide for normally biasing said stator poles with opposite polarity, and means connecting said two second windings to a source of spaced current pulses of magnitude sufficient to reverse the polarity of said biased stator poles during each pulse of current.

References Cited in the file of this patent

UNITED STATES PATENTS

| Number | Name | Date |
|---|---|---|
| 1,502,840 | Beard | July 29, 1924 |
| 1,787,620 | Favarger | Jan. 6, 1931 |
| 1,990,665 | Hyburg | Feb. 12, 1935 |
| 2,499,316 | Johnson | Feb. 28, 1950 |

FOREIGN PATENTS

| Number | Country | Date |
|---|---|---|
| 28,539 | Great Britain | of 1902 |